United States Patent [19]

Barlage

[11] Patent Number: 5,396,412
[45] Date of Patent: Mar. 7, 1995

[54] SYNCHRONOUS RECTIFICATION AND ADJUSTMENT OF REGULATOR OUTPUT VOLTAGE

[75] Inventor: Francis M. Barlage, Tucson, Ariz.

[73] Assignee: AlliedSignal Inc., Morris Township, Morris County, N.J.

[21] Appl. No.: 936,686

[22] Filed: Aug. 27, 1992

[51] Int. Cl.$^6$ ............................................. H02M 7/217
[52] U.S. Cl. ...................................... 363/89; 363/127; 323/222; 323/266; 323/282
[58] Field of Search ............... 323/222, 266, 282, 284; 363/89, 127

[56] References Cited

U.S. PATENT DOCUMENTS

| | | | |
|---|---|---|---|
| 4,189,670 | 2/1980 | Tanahashi | 323/267 |
| 4,355,277 | 10/1982 | Davis et al. | 323/222 |
| 4,449,173 | 5/1984 | Nishino et al. | 363/21 |
| 4,456,833 | 6/1984 | Traub et al. | 323/268 |
| 4,459,537 | 7/1984 | McWhorter | 323/266 |
| 4,536,700 | 8/1985 | Bello et al. | 323/222 |
| 4,549,255 | 10/1985 | Minamishima | 363/26 |
| 4,644,251 | 2/1987 | Rathke | 323/267 |
| 4,669,038 | 5/1987 | Whitford | 363/25 |
| 4,683,529 | 7/1987 | Bucher | 323/222 |
| 4,779,185 | 10/1988 | Musil | 323/282 |
| 4,849,868 | 7/1989 | Fisher | 363/21 |
| 4,940,929 | 7/1990 | Williams | 323/222 |
| 5,028,861 | 7/1991 | Pace et al. | 323/284 |
| 5,122,728 | 6/1992 | Ashley | 323/282 |
| 5,180,964 | 1/1993 | Ewing | 323/222 |
| 5,216,351 | 6/1993 | Shimada | 323/266 |

OTHER PUBLICATIONS

Application Note U-103 "Using Bipolar Synchronous Rectifiers Improves Power Supply Efficiency", pp. 312–318, Jan. 8, 1991.

Primary Examiner—Jeffrey L. Sterrett
Attorney, Agent, or Firm—James W. McFarland; Robert A. Walsh

[57] ABSTRACT

Output voltage of a switching regulator is rectified and adjusted by the internal body diode of an FET. When the output voltage exceeds a reference voltage, the FET is gated off, causing the internal body diode to reduce the output voltage by a diode drop. When the FET is turned on, the diode is shorted and, as a result, the output voltage is increased by a finite amount of additional energy. This adjustment range, a diode drop, is significant for low voltage, wide bandwidth power supplies.

8 Claims, 3 Drawing Sheets

SYNCHRONOUS RECTIFICATION AND ADJUSTMENT OF REGULATOR OUTPUT VOLTAGE

BACKGROUND OF THE INVENTION

This invention relates in general to power supplies and in particular to output stages for switching regulators.

Power supplies are classified under linear regulators, switching regulators and resonant converters. Linear regulators are relatively inefficient at converting an input voltage to an output voltage, delivering up to 25 watts at 30–50% efficiency. Resonant converters are far more efficient, delivering up to 150 watts with an efficiency of 85–90%. At the higher wattages, however, switching regulators are preferred, delivering up to 2000 watts with an efficiency between 70 and 90%.

Switching regulators include buck regulators and flyback regulators. The buck regulator converts a high input voltage to a lower output voltage. A power output switch chops up the input voltage into a stream of pulses which are rectified into direct current by an output stage. Although low in cost, weight and size, the buck regulator does not provide isolation between the input and output. Further, it usually provides only one output.

The flyback regulator, in contrast, can provide multiple outputs per circuit with full isolation. A power input switch chops up the dc voltage across the primary winding of a main switching transformer. A series of output stages are inductively coupled to the primary winding, each rectifying and filtering the induced voltage to provide an output voltage.

A basic output stage 2 for a switching regulator is shown in FIG. 1. The output stage 2 includes a choke 4, a diode 6 and a capacitor 8, which form a main loop. Energy is stored in the choke 4. In a flyback regulator, the choke 4 is physically part of the main switching transformer. Through half-wave rectification, the diode 6 provides a direct current with large ripple. The ripple is greatly reduced by the capacitor 8, which stores charge during most of the period when the diode 6 is conducting and releases charge during the rest of the period. The voltage across the capacitor 8 is the output voltage $V_{out}$.

However, a substantial increase in load will cause a significant increase in voltage drop through the diode 6 and any other resistance components. Thus, the output voltage will also change significantly.

Most integrated circuits do not function properly unless the output voltage is maintained within a certain range. For example, a five volt supply for bipolar logic usually must be regulated between 4.75 and 5.25 volts.

Supplies capable of such regulation are presently available. The output voltage is regulated by a control loop (usually in the input stage), typically including a reference, integrator, attenuator (if needed), loop stability compensator and feedback signal. The feedback signal is supplied to an integrator (which provides negative feedback for stabilization) where it is effectively compared with the reference signal. The output of the integrator is compared to an oscillatory signal (usually a triangular waveform) by a comparator. The comparator functions as a pulse width modulator and controls the power input switch duty cycle, which controls the amount of energy stored in choke 4.

However, modern power supplies cannot easily be regulated to meet the accuracy and bandwidth required by the newer integrated circuits which, due to closer spacing of internal components, operate at lower voltages. Integrated circuits rated at 3.3 volts are presently available, and technology forecasts are predicting that the newer integrated circuits will be operated between two and three volts.

SUMMARY OF THE INVENTION

Apparatus adjusts the output voltage provided by the main loop of an output stage of a switching regulator, allowing the regulator to meet the accuracy and bandwidth required by the newer integrated circuits. The main loop of the output stage includes storing means for storing energy from an input stage of the regulator and filtering means for filtering the stored energy. The apparatus comprises transistor means for coupling a first current path into the main loop when the transistor means is in a first state and for coupling a second current path into the main loop when the transistor means is in a second state. The first current path has a diode drop, and the second current path has an IR drop that is lower than the diode drop. The apparatus further comprises modulating means which modulates the transistor means between the first and second states such that the output voltage approaches a reference voltage.

DETAILED DESCRIPTION OF THE PREFERRED EMBODIMENT

Figure 1:
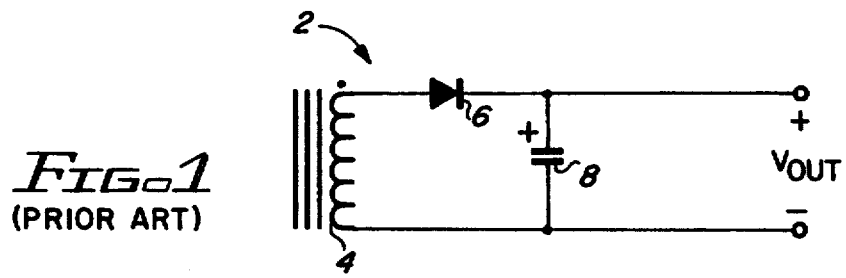
FIG. 1 is a schematic diagram of a prior art output stage for a switching regulator.
Figure 2:
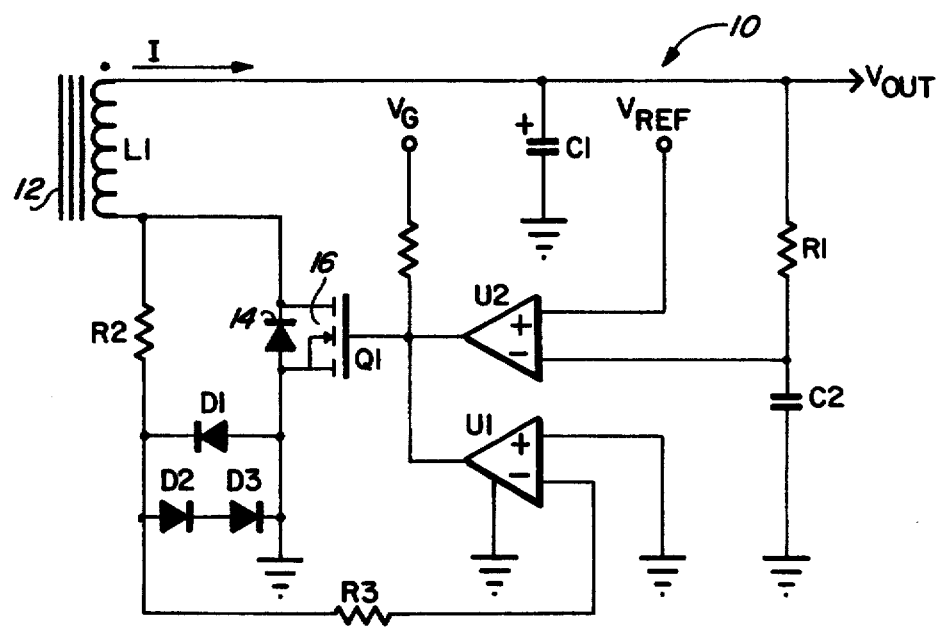
FIG. 2 is a schematic diagram of an output stage using a voltage sense approach according to the present invention.

FIG. 2 shows a single output stage 10 of a flyback regulator. Changing flux distributions in a magnetic core 12 cause a pulsating current to be induced into an inductor L1. The pulsating current at the dot end of the inductor L1 is rectified by the body diode 14 of an FET Q1 and filtered by a capacitor C1. The voltage across the capacitor C1 is the output voltage $V_{out}$, which is applied to a load (not shown).

The output voltage $V_{out}$ is adjusted by a finite amount by an adjustor, which utilizes the FET Q1 in a voltage mode control loop. When the FET Q1 is turned off, the pulsating current flows out of the dot end of the inductor L1 in the direction of the arrow I, flows to the load, or charges the capacitor C1, and returns to the other end of inductor L1 via the internal body diode 14. Because the pulsating current is rectified solely by the body diode 14, the output voltage developed across capacitor C1 is equal to the voltage across the inductor L1 minus the diode drop from the body diode 14 (ignoring IR drops in the inductor winding resistance and loop path). Thus the energy in each current pulse is divided mainly between the diode loss and the output load.

When a turn-on voltage $V_G$ is applied to the gate of the FET Q1, the internal body diode 14 is shorted by a low resistance channel 16 in the FET Q1. Thus, the body diode 14 is replaced in the main loop by the channel 16 and, as a result, the diode loss is eliminated. Now, energy in each pulse is divided primarily between the load and the $I^2R$ loss in the FET Q1, which by design is much lower than the losses from the body diode 14. A 2N6796 FET has a typical channel resistance of 0.18 $\Phi$, and other FETs have channel resistances as low as 0.010 $\Phi$. Ideally, the FET channel 16 would have zero resistance. Thus, by turning on the FET Q1, the body diode loss is eliminated, and a small, but finite amount of additional energy, is delivered to the load.

The amount of adjustment ($V_{drop}$) is varied by varying the duty cycle ($\delta$) of the on-time of the FET Q1:

$$V_{drop} \le V_{DS} \cdot \delta$$

where $0 \le \delta \le 1$ and $V_{DS}$ is equal to the diode drop of the body diode 14. Typically the diode drop is approximately 0.8 volts. Thus, by modulating the FET Q1, the adjustment can be in the range of $\pm 0.4$ volts. On large output voltages, the range adjustment is relatively insignificant. (e.g., $\pm 1.7\%$ correction for a 24 volt output). However, for smaller output voltages, the range adjustment becomes quite substantial. For example, a five volt power supply can be adjusted by approximately $\pm 0.4$ volts, which is $\pm 8\%$. A three volt power supply would have an even wider adjustment range of $\pm 13.3\%$. Thus, the range adjustment is inversely related to the output level.

The adjustor further includes first and second comparators U1 and U2 which pulse modulate the FET Q1. The first comparator U1 generates pulses ensuring that the FET Q1 is gated on only when the energy stored in the inductor L1 is being transferred to the capacitor C1 (i.e., when current I is flowing in the direction of the arrow I). Should the FET Q1 be turned on at any other time, the current I would reverse direction and start discharging the capacitor C1, thereby significantly reducing the efficiency of the power supply. However, as long as the FET Q1 is gated off, the body diode 14 prevents the current from flowing in the reverse direction.

The second comparator U2 either inhibits or allows the pulses generated by the first comparator U1 to reach the gate of the FET Q1. It compares the output voltage $V_{out}$ to a reference voltage $V_{ref}$. If the output voltage $V_{out}$ exceeds the reference voltage $V_{ref}$, the output of the second comparator U2 goes low, clamping the gate of the FET Q1 to roughly zero volts. As a result, the FET Q1 is gated off and its body diode 14 is placed in the loop with the capacitor C1 and inductor L1. The FET Q1 remains off until the output voltage $V_{out}$ is dropped to the level of the reference voltage $V_{ref}$.

If the second comparator U2 is a true comparator, it will do a high frequency oscillation whenever the output voltage $V_{out}$ is very close to the reference voltage $V_{ref}$. However, such oscillation is undesirable: because the pulses from the first comparator U1 are broken up (i.e. pulse width modulated), switching losses are significantly increased. To prevent the high frequency oscillation, a small amount of hysteresis is introduced by an R-C filter (first resistor R1 and second capacitor C2), on the feedback signal. This filter delays the response of the second comparator U2 such that the inductor L1 can completely discharge the energy stored in the core 12 before the FET Q1 is turned off.

To prevent overvoltages from being applied to the inverting input of the first comparator U1, the voltage signal on the drain of the FET Q1 is buffered by a second resistor R2 and then clamped below ground (e.g., approximately $-0.6$ volts) by a first diode D1 and to an upper voltage (e.g., $+1.2$ volts) by second and third diodes D2 and D3. A third resistor R3 limits the current flowing from the inverting input of the first comparator U1 when the buffered signal is below ground. It should be noted that the comparators U1 and U2 can be replaced by comparators that do not require all of these protective components D1-D3, R2 and R3. They could also be replaced by faster comparators which, although more expensive, would provide superior performance.

Figure 3:
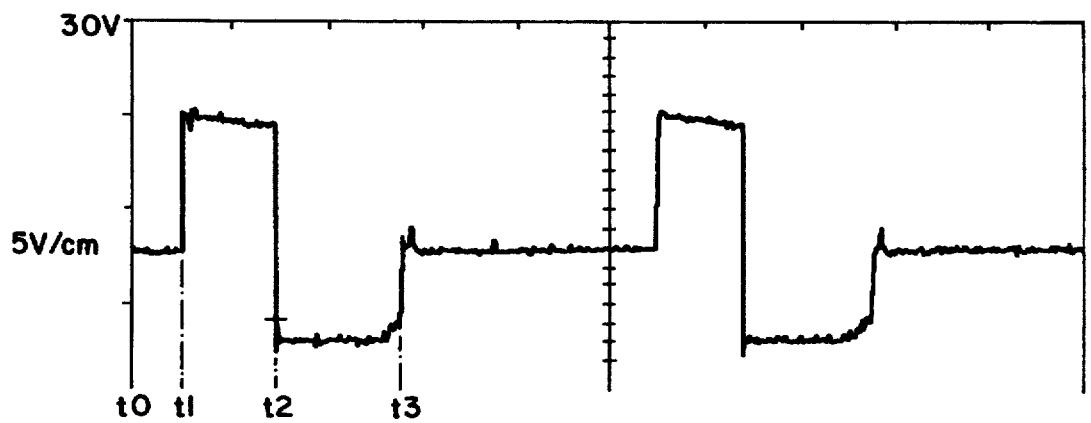
FIG. 3 is a trace of voltage on the drain of an FET, which forms a part of the output stage shown in FIG. 2.

FIG. 3 shows the voltage at the cathode of the body diode 14 for a flyback regulator that provides an output voltage $V_{out}$ of five volts and an FET Q1 turn-on voltage $V_G$ of fifteen volts. Between times $t_0$ and $t_1$, the cathode stays at five volts as energy is neither being stored or discharged by the core 12 in the inductor L1.

At time $t_1$, the power switching transistor is turned on, causing the primary winding to drive the voltage across the inductor L1 in the opposite polarity (i.e., the dot end becomes negative with respect to the other end). Although the voltage across the FET Q1 is actually positive, the FET Q1 is gated off by the first comparator U1. The body diode 14 blocks currents that would otherwise discharge the capacitor C1.

Between times $t_1$ and $t_2$, energy is stored in the core of the main switching transformer. The FET Q1 is kept off by the first comparator U1.

At time $t_2$ the power switching transistor is turned off and the flux in the core 12 starts to collapse, thereby reversing all winding voltages and causing the dot end of the inductor L1 to become positive with respect to the other end. Current flows out of the dot end, charges the capacitor C1, flows to ground and returns to the inductor L1 via the body diode 14.

From time $t_2$ to $t_3$ the voltage on the inverting input of the first comparator U1 is negative with respect to ground. The first comparator U1 allows the gate voltage of the FET Q1 to rise to $+15$ volts, whereby the FET Q1 is turned on. The gate voltage will be turned on provided that the second comparator U1 also allows the gate voltage to rise.

Beyond time $t_3$ the energy stored in the transformer core 12 is gone; therefore the voltage across the inductor L1 is free floating, with the dot end being tied to the $+5$ volt output and the other end doing a high frequency exponential decay parasitic oscillation centered about $+5$ volts.

Thus control of gate voltage allows the output voltage $V_{out}$ to be varied by a finite amount without perturbing the main loop. Because the adjustor compensates the output voltage $V_{out}$ for load changes on a pulse by pulse decision, the bandwidth of the adjustor is limited only by the frequency of the switching pulses to the power output switch. At a frequency of 100 kHz, the output has a bandwidth of approximately 100 kHz, which is over ten times the bandwidth of most switching regulators. Thus, the higher bandwidth allows the adjustor to respond quickly to rapid load changes.

With its wide bandwidth, the adjustor can also reject ripple caused by input line variations. Operating at a frequency of 100 kHz, the adjustor can compensate at 10 microsecond intervals. For a primary control loop with a 5 kHz bandwidth, this means an adjustment resolution improvement of approximately 20:1 (on a 1 V band this is approximately 50 mV per step). Thus, the adjustor allows a power supply with voltage mode control loop to reject input line ripple with results comparable to a power supply with a current mode control loops.

The adjustor can also be adapted for use in a switching regulator having multiple outputs. To save parts and cost, the highest power output is typically regulated and the other outputs are "cross-regulated" via the design of the magnetics, choice of capacitors and diodes. All other outputs may now have good regulation without the need for additional pass elements (magnetic amplifier, transistor, etc.). Eliminated is the need for additional components (e.g., a series regulator, a magnetic amplifier post regulator or a separate control loop) which add cost and space and consume power and thereby lower the efficiency of the power supply.

Figure 4:
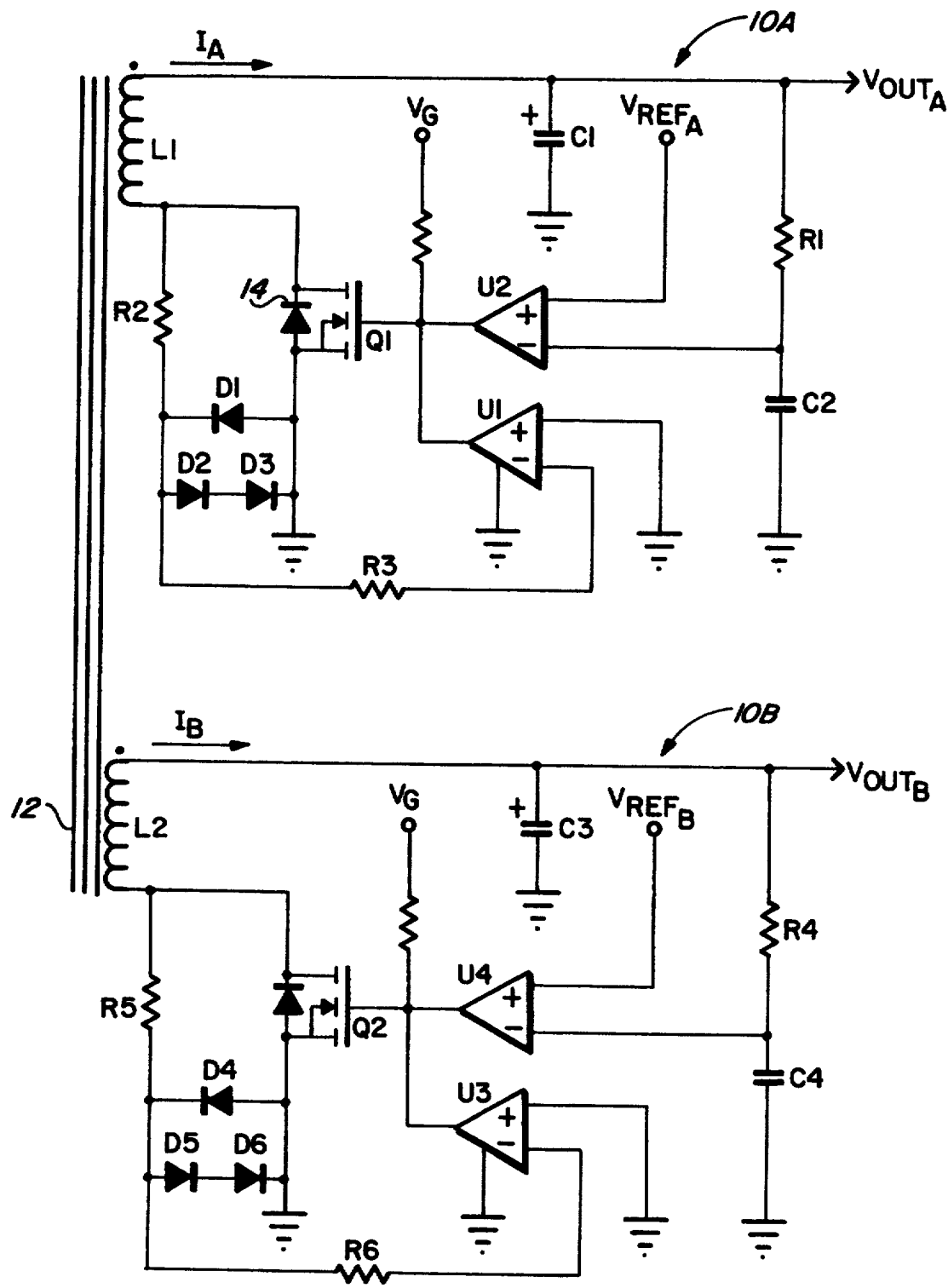
FIG. 4 is a schematic diagram of a switching regulator having multiple output stages of the type shown in FIG. 2.

To provide precise control each output stage $10_A$ and $10_B$ would be adjusted by a dedicated adjustor (see FIG. 4). Thus, each loop would be provided with limited range adjustment. As such, a regulator would achieve very precise control of all outputs without a loss in power or the possibility of introducing a control loop instability due to multiple control loops or the possibility of shutting down one output and back biasing electronic integrated circuits.

The adjustor of FIG. 2 uses a voltage sense approach to gate the FET Q1 on and off. However, a current sense approach can also be used.

Figure 5:
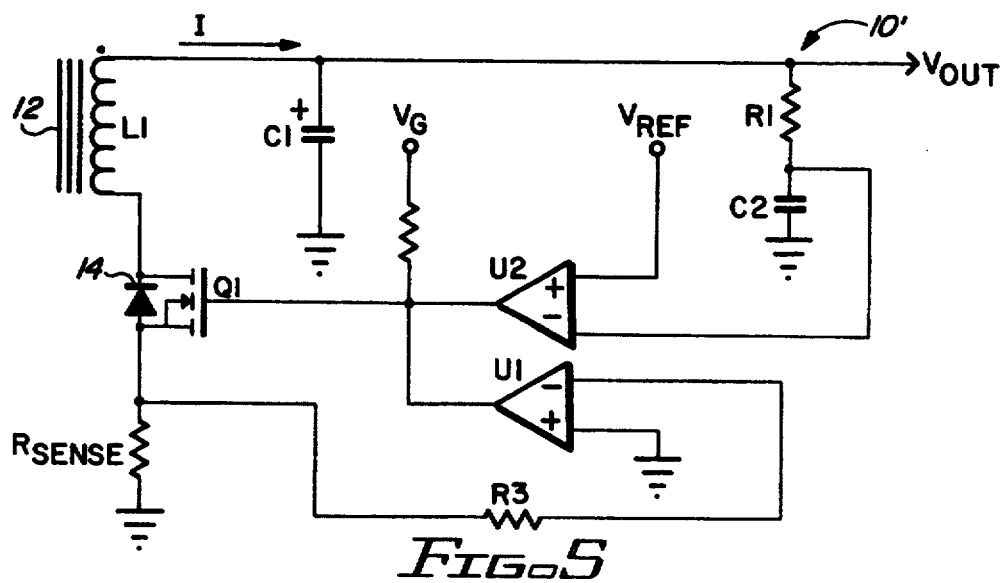
FIG. 5 is a schematic diagram of an output stage using a current sense approach according to the present invention.

FIG. 5 shows the adjustor of an output stage 10' utilizing a current sense control loop. When the energy stored in the inductor L1 is being transferred to the load (not shown), or capacitor C1, the current flows in the direction of the arrow I. As the current flows into the resistor $R_{sense}$, the voltage at the top of the resistor $R_{sense}$ goes negative with respect to ground. This negative voltage is sensed by the first comparator U1, whose output goes high. If the output of the second comparator U2 is also high (i.e., the output voltage $V_{out}$ is lower than the reference voltage $V_{ref}$), the FET Q1 is turned on. When the current reverses direction, the top of the resistor $R_{sense}$ goes positive, driving the output of the first comparator U1 to ground and gating off the FET Q1.

The resistor $R_{sense}$ has a low resistance, such as 0.02 ohms. Yet despite the low resistance, power is lost in this resistor $R_{sense}$. Therefore, the voltage sense approach is preferred over the current sense approach for single output switching regulators.

Figure 6:
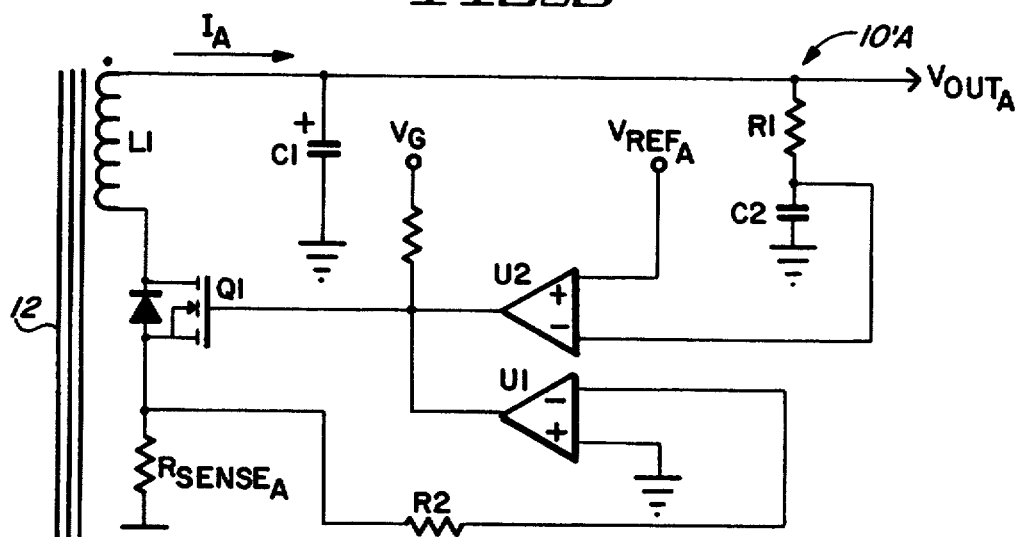
FIG. 6 is a schematic diagram of a switching regulator having multiple output stages of the type shown in FIG. 5.
Figure 6:
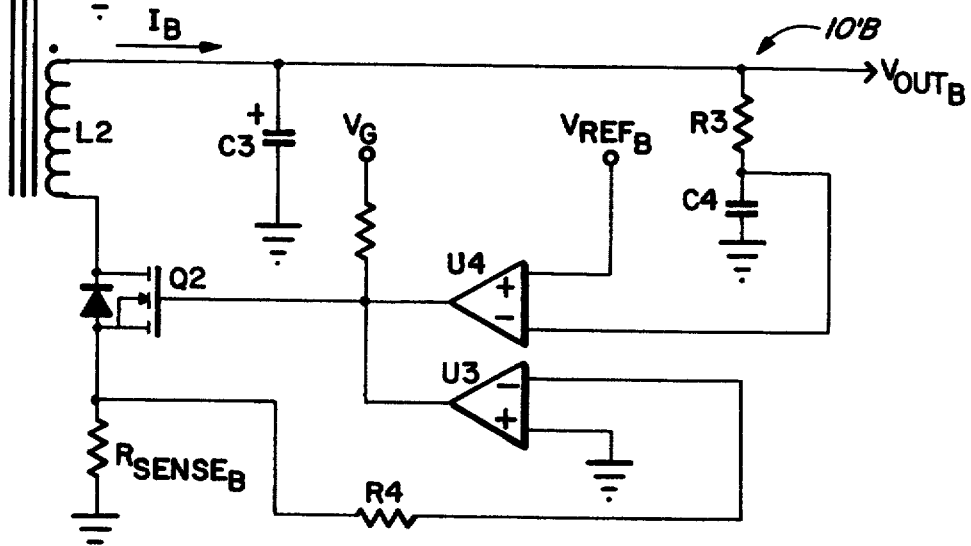

However, the current sense approach is preferred over the voltage sense approach for switching regulators having multiple output stages $10'_A$ and $10'_B$ (see FIG. 6). Each FET Q1 and Q2 turns off exactly when the currents flowing therethrough reverse directions. If current from the first stage $10'_A$ reaches zero before the current from the second stage $10'_B$, the voltage across the inductor L1 changes very slightly due to the current still flowing through the second inductor L2, which is coupled to the first inductor L1 via the transformer core 12.

In contrast, the currents do not all change directions at the same time for the multiple output stages $10_A$ and $10_B$ using the voltage sense approach (FIG. 4). Because the drains of all the FETs Q1 and Q2 are cross-coupled through the core 12, the drain of one FET is held low by another output. Therefore, the one FET remains on (when it should be off), causing its capacitor to be discharged and the efficiency of the power supply to be reduced.

Although the Figures show the FETS Q1 and Q2 being N-channel types, P-channel FETs could also be used. The drain of the P-channel FET could, for example, be connected to the dot end of the inductor L1 and the FET source would be connected to the positive side of the capacitor C1. The first comparator U1 would be reconfigured to recognize the common mode signals (source and drain) and both comparators U1 and U2 would be changed to provide negative (with respect to the FET source) pulses to turn on the P-channel FET. Nevertheless, N-channel FETs are normally chosen because of their lower channel resistance, lower cost and ease of implementation.

The FET Q1 with its internal body diode for rectification could be replaced by a bipolar transistor whose controlled current path is in parallel with a diode. Naturally the base drive of the bipolar transistor would have to be modified.

Therefore, it will be understood that the embodiments described herein are merely exemplary and that a person skilled in the art may make many modifications and variations without departing from the spirit and of the present invention. All such modifications are intended to be included within the scope of the present invention as defined by the appended claims.

I claim:

1. Apparatus for adjusting the output voltage provided by the main loop of an output stage of a switching regulator, said main loop including storing means for storing energy from an input stage of said regulator and filtering means for filtering said stored energy, said apparatus comprising:

transistor means for coupling a first current path into said main loop when said transistor means is in a first state and for coupling a second current path into said main loop when said transistor means is in a second state, said first current path having a diode drop, said second current path having an IR drop that is lower than said diode drop; and modulating means, responsive to said output voltage, for modulating said transistor means between said first and second states to cause said output voltage to approach a reference voltage, said transistor means including an FET having a body diode and a conductive channel, said body diode being coupled into said main loop when said FET is gated to said first state, said conductive channel being coupled into said main loop when said FET is gated to said second state, said modulating means including first means for providing a first signal when energy is being stored by said storing means and second means for providing a second signal when said output voltage exceeds said reference voltage, said FET, in response to said first and second signals, being gated to said first state when said energy is being stored and when said output voltage exceeds said reference voltage, said first means including a comparator for comprising said voltage at said storing means to a reference potential, an output of said comparator furnishing said first signal.

2. The apparatus of claim 1, wherein said modulating means further includes protection means for protecting said comparator from overvoltages.

3. Apparatus for adjusting the output voltage provided by the main loop of an output stage of a switching regulator, said main loop including storing means for storing energy from an input stage of said regulator and filtering means for filtering said stored energy, said apparatus comprising:

transistor means for coupling a first current path into said main loop when said transistor means is in a first state and for coupling a second current path into said main loop when said transistor means is in a second state, said first current path having a diode drop, said second current path having an IR drop that is lower than said diode drop; and modulating means responsive to said output voltage, for modulating said transistor means between said first and second states to cause said output voltage to approach a reference voltage, said transistor means including an FET having a body diode and a conductive channel, said body diode being coupled into said main loop when said FET is gated to said first state, said conductive channel being coupled into said main loop when said FET is gated to said second state, said modulating means including first means for providing a first signal when energy is being stored by said storing means and second means for providing a second signal when said output voltage exceeds said reference voltage, said FET, in response to said first and second signals, being gated to said first state when said energy is being stored and when said output voltage exceeds said reference voltage, said second means including a comparator for comparing said reference voltage to said output voltage, an output of said second comparator furnishing said second signal, said second means further including hysteresis means for introducing hysteresis into said comparator.

4. The apparatus of claim 3, wherein said hysteresis means includes an RC filter coupled between an input of said comparator and a leg of said main loop providing said output voltage.

5. A switching regulator output stage for providing an output voltage, comprising:

an inductor;

a capacitor coupled in a loop with said inductor;

a transistor having an internal body diode and a conductive channel, said internal body diode being coupled into said loop when said transistor is in a first state, said conductive channel being coupled into said loop when said transistor is in a second state; and modulating means, responsive to said output voltage, for modulating said transistor between said first and second states to cause said output voltage to approach a reference voltage;

said modulating means including first means for providing a first signal when energy is not being discharged by said inductor and second means for providing a second signal when said output voltage exceeds said reference voltage;

said transistor, in response to said first and second signals, being gated to said second state only when energy is being discharged from said inductor and said output voltage is less than or equal to said reference voltage, and remains in said first state at all other times;

said first means including a first comparator for comparing said voltage at said inductor to a reference potential, an output of said comparator furnishing said first signal;

said second means including a second comparator for comparing said reference voltage to said output voltage, an output of said second comparator furnishing said second signal.

6. The output stage of claim 5, wherein said first means includes an RC filter coupled between an input of said first comparator and a leg of said main loop providing said output voltage.

7. The apparatus of claim 5 wherein said first means includes sensing means for sensing the direction of current flowing through said main loop.

8. A flyback regulator having an input stage and at least two output stages comprising:

at least one inductor that is inductively coupled to said input stage;

at least one capacitor coupled in a loop with said inductor:

a transistor having an internal body diode and a conductive channel, said internal body diode being coupled into said loop when said transistor is in a first state, said conductive channel being coupled into said loop when said transistor is in a second state; and modulating means, responsive to said output voltage, for modulating said transistor between said first and second states to cause said output voltage to approach a reference voltage, said modulating means of each output stage including:

sensing means for sensing the direction of current flowing through said main loop;

a first comparator for comparing a voltage at said sensing means to a reference potential, an output of said first comparator furnishing a first signal; and a second comparator for comparing said reference voltage to said output voltage, an output of said second comparator furnishing a second signal, said transistor being responsive to said first and second signals by gating to said second state only when energy is being discharged from said inductor and said output voltage is less than or equal to said reference voltage, and remaining in said first state at all other times.

* * * * *